March 31, 1970 H. R. HALLMAN 3,504,348

DATA TRANSFER CONTROLLER

Filed July 3, 1967 4 Sheets-Sheet 1

INVENTOR.
HENRY R. HALLMAN
BY George L. Kensinger
ATTORNEY

March 31, 1970 H. R. HALLMAN 3,504,348

DATA TRANSFER CONTROLLER

Filed July 3, 1967 4 Sheets-Sheet 3

INVENTOR.
HENRY R. HALLMAN
BY George L. Kensinger
ATTORNEY

INVENTOR.
HENRY R. HALLMAN
BY George L. Kensinger
ATTORNEY 3,504,348
Patented Mar. 31, 1970

3,504,348

DATA TRANSFER CONTROLLER

Henry R. Hallman, Norristown, Pa., assignor to Burroughs Corporation, Detroit, Mich., a corporation of Michigan Filed July 3, 1967, Ser. No. 651,015
Int. Cl. G06f *1/00*
U.S. Cl. 340—172.5 14 Claims

ABSTRACT OF THE DISCLOSURE

Apparatus for converting and transmitting the output signals of record readers, automatically inserting certain characters or codes into the output when erroneously absent therefrom, and incrementally controlling the advancement of record members therein as data transfer is effected, subject to predetermined overriding control codes and certain character sequences for causing continuous record advancement and for generating preselected output characters or codes.

BACKGROUND OF THE INVENTION

This invention relates to the transmission of data and control information from record readers and data transfer devices in data processing systems. More specifically, the subject invention relates to the control and operation of readers or data communication devices utilized in such systems as input devices or as devices for transmitting stored information.

Several data transfer systems utilizing input/output control units or communications control modules have been developed for serially receiving, buffering and transmitting information signals between input devices and the central units of data processing systems, as illustrated by H. R. Hallman et al. U.S. Patent No. 3,274,561, issued on Sept. 20, 1966, and J. T. Lynch et al. U.S. Patent No. 3,320,182, issued on Jan. 31, 1967, both assigned to the same assignee as the present invention.

SUMMARY OF THE INVENTION

A need has arisen for apparatus for coupling line-at-a-time document readers and other parallel input devices to serial input terminals of data processing systems, for controlling the operation of the device and performing code conversion upon the output thereof, responsive to predetermined control codes for generating certain control signals and preselected output words, and for generating and automatically inserting certain characters or codes into the output when erroneously absent therefrom.

Accordingly, it is an object of the subject invention to provide a controller for coupling and controlling various record readers and data transfer devices as input devices in electronic data processing systems.

Another object of this invention is to convert and transmit the output of record readers to serial input terminals of data processing systems and to incrementally control the advancement of record members therein, subject to overriding control codes.

A further object of the invention is to provide record reader controller apparatus for generating record advancement control signals and preselected output words in response to predetermined control codes in the output of the reader.

A still further object of the present invention is to generate special information characters responsive to certain control codes received from a record reader and to automatically insert such characters into the output when erroneously absent therefrom.

In accordance with the above-mentioned objects there is provided a data transfer controller having code converter means adapted to receive the output of a record reader or data transfer device; output means for controllably transmitting information and control signals, electrically connected to the converter means; and control means adapted to receive control codes and signals from the data transfer device, and electrically connected for transmitting control signals to the data transfer device commanding incremental information shift or record advancement therein as data transfer is effected, subject to overriding control codes. There is also provided a control code decoder adapted to receive the output of the reader or data transfer device for changing the mode of record or information advancement in response to predetermined control codes and certain character sequences and means connected to the decoder for generating preselected output control words in response to the receipt and decoding of such control codes.

There is further provided a decoder for information mode shift characters adapted to receive the output of the reader device, and information mode shift character generation means electrically connected to the shift character decoder and to the output means for inserting such characters into the output when absent therefrom and the information mode changes.

Also provided is a character sequence decoder electrically connected to the code converter means and to the control means for causing continuous record advancement in the reader upon the receipt of a preselected character sequence.

These and other objects, advantages and uses of the present invention and additional unobvious and useful features thereof will become more apparent from the following detailed description of the invention and its environment, wherein.

Figure 4:
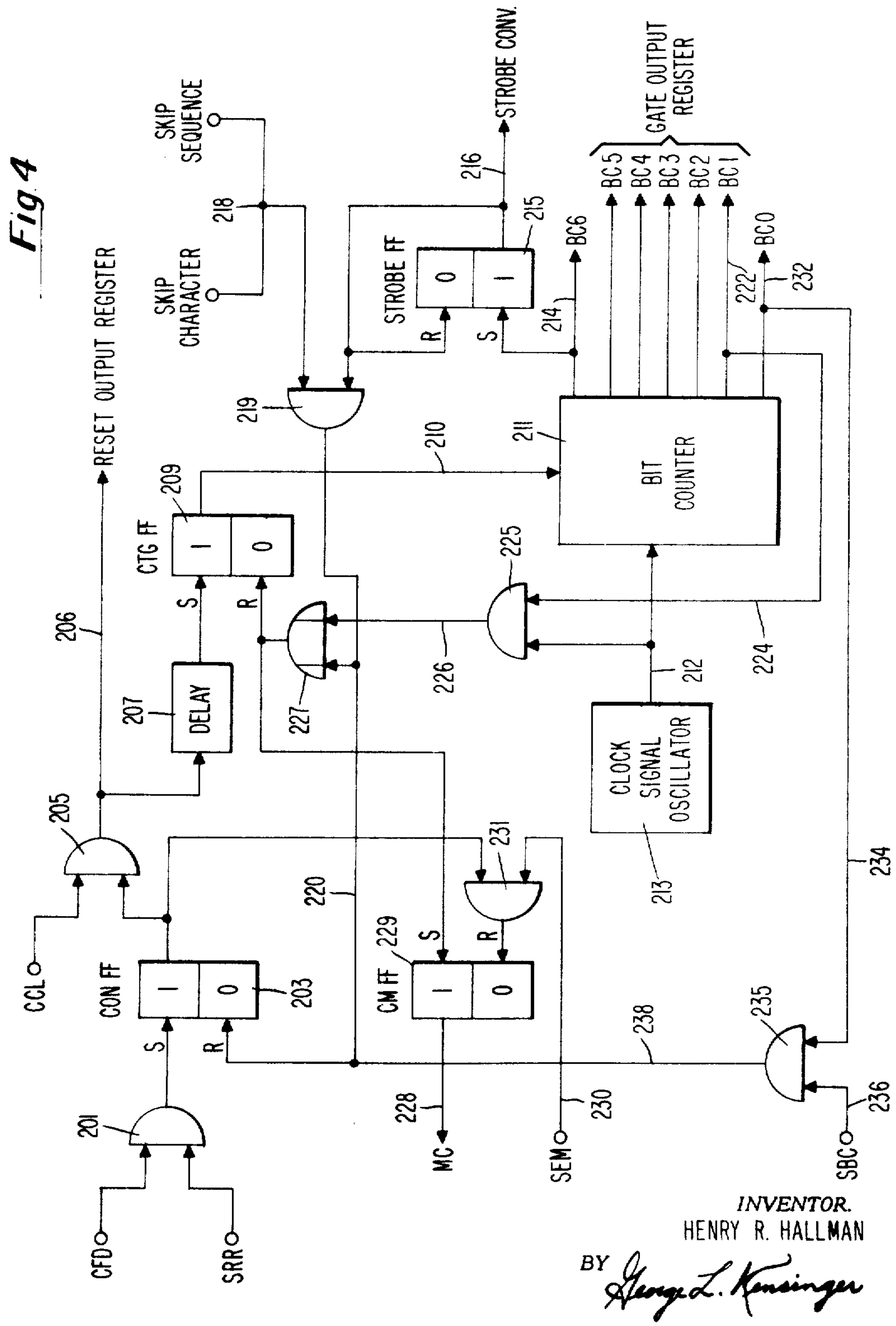
Figure 5:
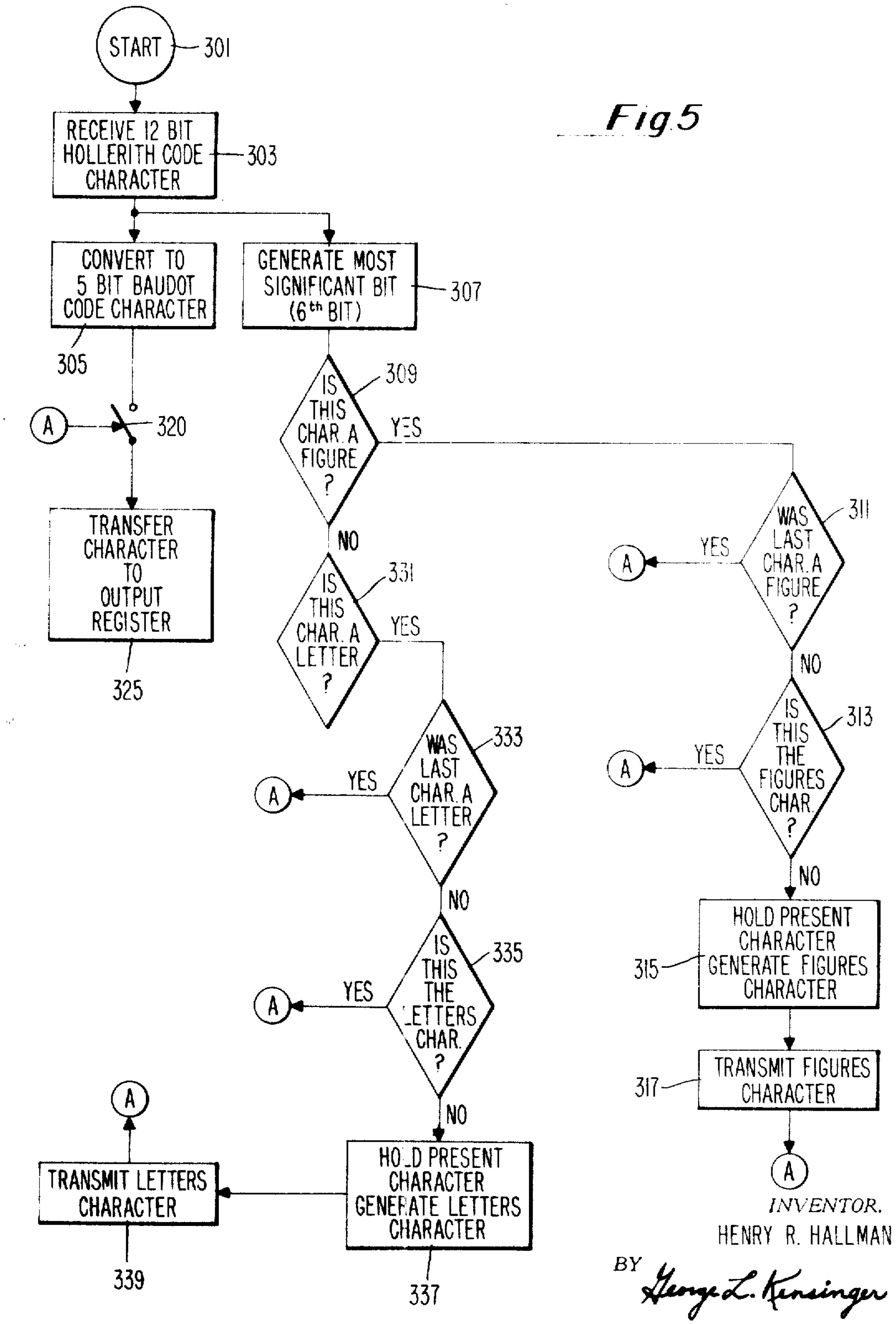

FIGURE 4 is a detailed electrical schematic block diagram of a preferred embodiment for implementing a portion of the record movement and information flow control functions of the invention; and FIGURE 5 is a diagram of a flow chart illustrating a series of steps which may be followed for providing automatic generation and insertion of certain characters in the output of the controller when erroneously absent in the record reader output.

DESCRIPTION OF THE PREFERRED EMBODIMENTS

Figure 1:
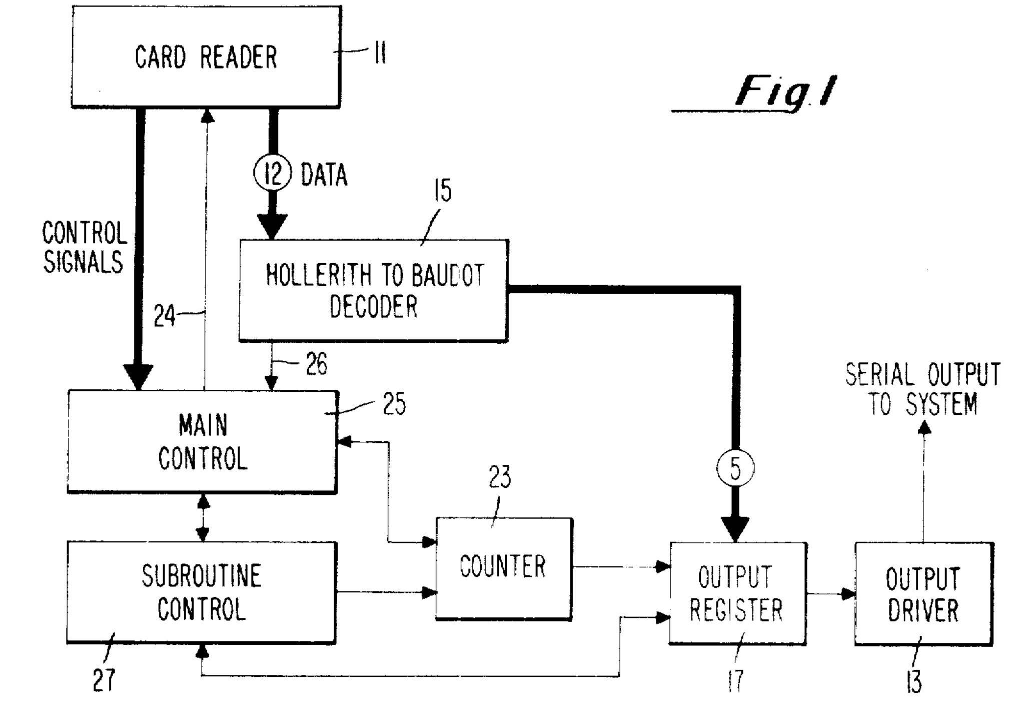
FIGURE 1 is a schematic block diagram of an illustrative embodiment of the data transfer controller of the present invention.

In FIGURE 1 a reader controller embodiment of the subject invention is shown for controlling, converting and serially transmitting the output of a card reader 11 through an output driver 13 to a data processing or data communications system. Information signals are received in parallel by a decoder 15 from a row or column of a card in the card reader, a character at a time, and is conducted to output register 17 in a different code. This conversion may be from a 12-bit Hollerith binary code to a 5-bit Baudot Code, for example.

The transfer of information signals from output register 17 to output driver 13 is under the control of counter 23 which is activated by main control 25. Main control unit 25 receives control and reader clock signals from card reader 11, initiates and resets counter 23 and transmits card movement control signals back to the card reader over conductor 24. The main control unit also receives a bit of the input data over conductor 26 for determining when an information mode shift character is erroneously absent from the input data in order that it may be automatically inserted into the output register.

Also connected to main control 25, to counter 23 and to the output register, is subroutine control unit 27 for changing the mode of control of card advancement in card reader 11 from incremental advancement to a slew or skip mode in response to the detection of certain predetermined control codes received over the data lines or in response to control signals received by the main control unit directly from the card reader. The subroutine control unit also generates certain output characters in response to certain control codes, which are transmitted through output register 17 to output driver 13 under control of counter 23, which also is activated by the subroutine control unit.

Figure 2:
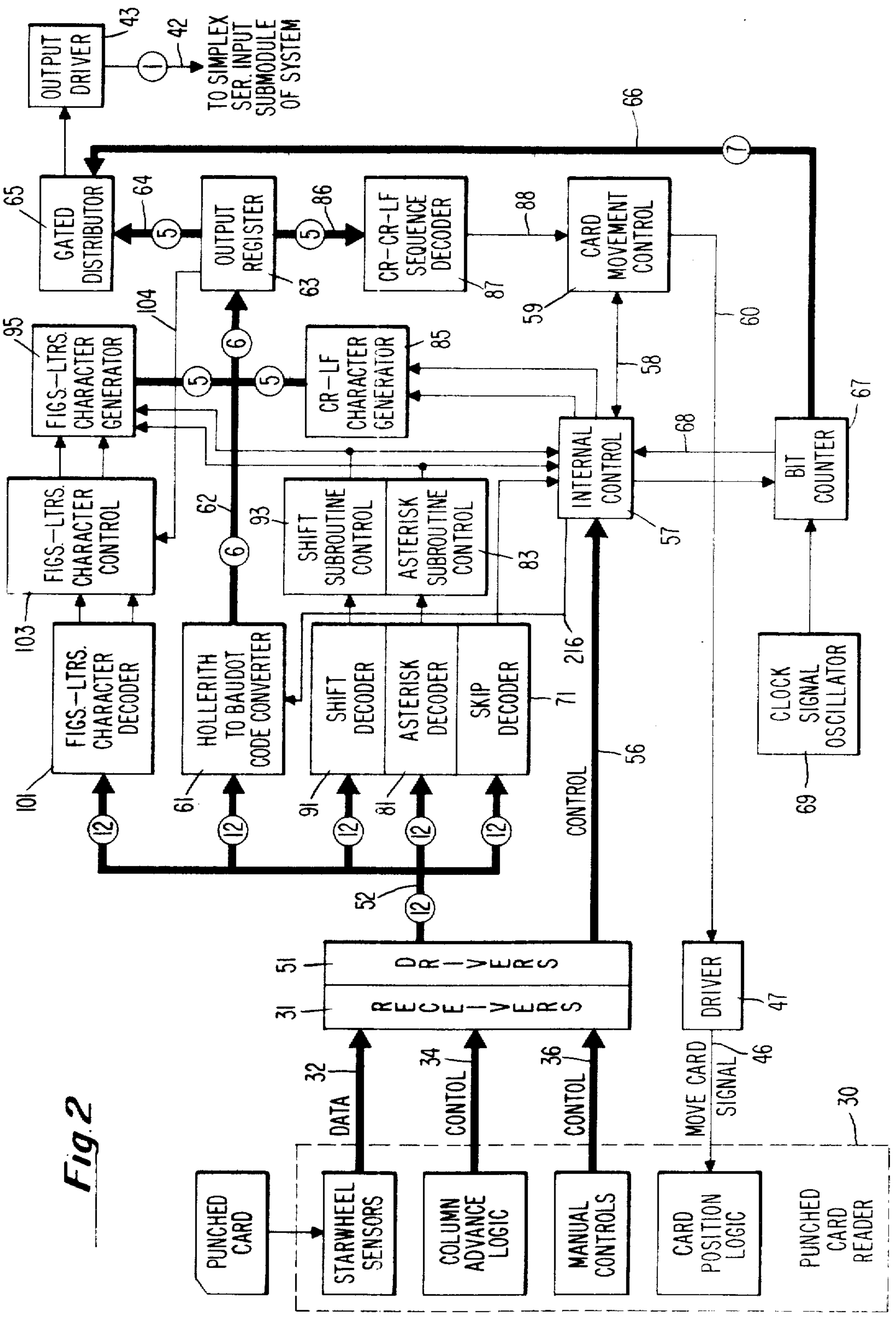
FIGURE 2 is an electrical schematic block diagram of a card reader controller embodiment of the invention.

In FIGURE 2 is shown a preferred embodiment of the invention for performing control and buffer functions necessary to the specified demand-mode control of the operation of a punched card reader. The controller is adapted for connection to a card reader 30 for receiving data and control signals and is adapted to be connected to a serial input terminal of a data processing system for which it functions as a simplex input device. The controller also provides card movement control signals to card position logic in the card reader for controlling card advancement therein.

Receivers 31 receive data signals from the sensing means of the reader such as starwheel sensors or photosensitive elements over data input bus 32. Control signals are received from the column advance logic of the card reader over control cable 34 and from manual controls of the card reader over control cable 36. Data signals are transmitted serially to the data processing system or utilization device over output conductor 42 connected to output driver 43. Card movement control signals from the controller are transmitted to the reader over conductor 46 from driver 47.

Drivers 51 are connected to receivers 31 for transmitting the coded data signals within the controller over data bus 52 and for delivering control signals to internal control 57 over control signal cable 56. Data signals on bus 52 are applied to code converter 61 which converts the input data from the binary Hollerith code received from the reader to the desired output code which is transmitted over data bus 62 to output register 63 from which it flows to gated distributor 65. The selected output code in the apparatus of FIGURE 2 is the "Baudot Code" which requires the transmission of five serial information bits from the converter to the output driver through output register 63 and gated distributor 65 for each character of information. Distributor 65 is gated by signals received over cable 66 from bit counter 67, which is initiated by control unit 57 and counted or pulsed by clock signal oscillator 69.

Figure 3:
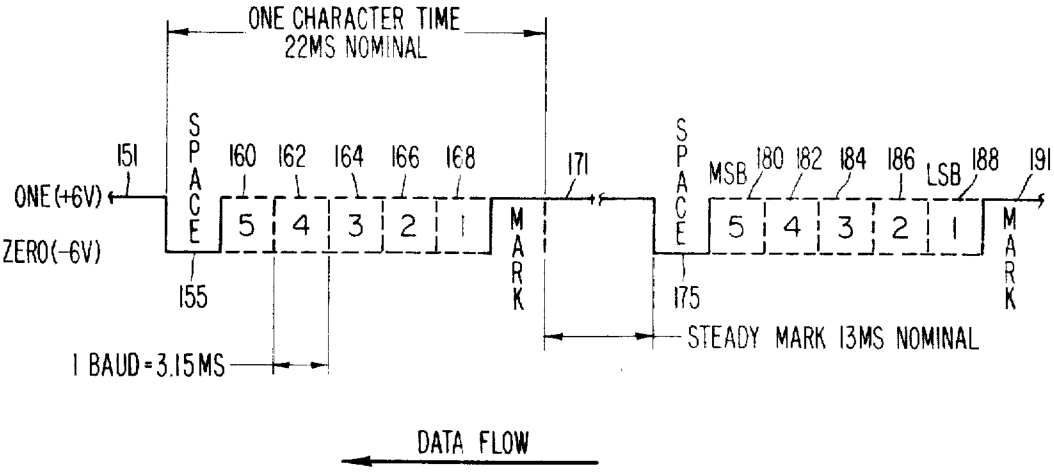
FIGURE 3 is an illustration of a pulse train showing the pulse code positions in a representative serial code which may be produced by a record reader controller conforming to the subject invention.

A timing format showing information bit positions and start and stop levels for serial Baudot Code representation of data is illustrated in FIGURE 3. A level of positive 6 volts is maintained between characters as indicated at 151, 171, 191, which is termed a "mark," nominally persists for 13 milliseconds as indicated at 171 and is reestablished after the least significant bit of each character.

Each character of information is initiated by a start baud or "space" pulse as indicated at 155, 175 of negative 6 volts, which is followed sequentially by the information bits in decreasing order of significance as shown at 160–168 and 180–188, the most significant bit appearing first in each character. The least significant bit of each character 168, 188 is followed by the stop or "mark" baud 171, 191. The nominal baud or bit pulse is 3.5 milliseconds in duration and one character time period is nominally 22 milliseconds in duration.

Returning to FIGURE 2, the five information bits of the Baudot output code are conducted to the gated distributor 65 while bit counter 67 transmits seven bit count pulses to the distributor for producing the serial 7 bits of the output code: the "start" baud, the first information bits or bauds, and the "mark" or stop baud. Only a single output driver is utilized in this illustrative controller embodiment.

Upon receipt of specified control signals from the card reader, internal control 57 initiates down-counting of bit counter 67. And upon receiving a signal over conductor 68 from the counter indicating that the count has nearly terminated, control 57 activates card movement control 59 which transmits a move card command signal over conudctor 60 to driver 47. Upon the receipt of a card movement signal over control cable 34 or 36, the internal control unit then deenergizes card movement control 59 which removes the card movement command signal from conductor 46 and, therefore, enables the termination of card movement after a discrete step. This results in step-by-step advancement of the card in the reader and in sequential reading of a column or character at a time by the controller for transmission to a system input terminal through output driver 43.

This control of record movement by internal control 57 and card movement control 59 of FIGURE 2 is illustrated in greater detail in the illustrative logic diagram of FIGURE 4. Upon receipt of a card field signal (CFD) and a concurrent reader ready switch signal (SRR) by AND gate 201, a continue reading flip-flop (CON FF) 203 is set. Then, upon the receipt of a reader column clock pulse (CCL) by gate 205 concurrent with the continue read signal level, a signal is generated on conductor 206 for resetting output register 63 of FIGURE 2 and for setting counting flip-flop (CTG FF) 209 after the delay of element 207.

The output level from counting flip-flop 209 is applied to counter 211 over conductor 210 for initiating sequential activation of the conductors labelled BC0 through BC6. Bit counter 211 (similar to bit counter 67 of FIGURE 2) is down-counted by signals received over conductor 212 from clock signal oscillator 213 (similar to clock signal oscillator 69 of FIGURE 2). The counting sequence is BC0, BC6, BC5 . . . BC0. The first output pulse appears on BC6 conductor 214 which is utilized for setting strobe flip-flop 215. The output signal from the strobe flip-flop appears on conductor 216 which is transmitted to the code converter of FIGURE 2 for strobing or gating the transmission of a data word to output register 63. This signal on conductor 216 is also used for opening gate 219 when concurrent with a skip character signal or skip sequence signal received on circuit terminal 218 for resetting counting flip-flop 209, setting CM flip-flop 229 and resetting CON flip-flop 203. The strobe signal on conductor 216 also resets the strobe flip-flop.

Bit counter output pulses BC6 through BC0 are applied to gated distributor 65 over cable 66 (FIG. 2). BC5 through BC1 gate the information from output register 63, which converts the output information from parallel form to serial form for transmission to the data system.

The BC1 counter signal appears on conductor 222 of FIGURE 4 and is transmitted by conductor 224 to open gate 225 in concert with a clock signal from oscillator 213 on conductor 212. The output signal of gate 225 appearing on conductor 226 is applied to the reset terminal of counting flip-flop 209 through OR gate 227 and to the set terminal of card movement flip-flop 229 (CM FF). Therefore, when the down-counting of the bit counter reaches count BC1, the counting flip-flop is reset so that the bit counter will proceed only to count BC0 and stop and card movement flip-flop 229 is set for transmitting a move card command signal to the card reader over conductor 228.

The card reader responds to the move card command signal by energizing its transport mechanism. Upon energization of the transport means in the card reader, a signal is generated and transmitted back to the data transfer controller over conductor 230 which is identified in FIGURE 4 as sense escape magnet signal SEM. This signal indicates that a record card is in movement or is about to be moved and resets card movement flip-flop 229 through AND gate 231, if CON FF 203 is in the ONE state, for terminating the move card command signal level appearing on conductor 228. The move card command signal, therefore, persists only a short period of time and results in incremental advancement of the record card by the reader, resulting in the card being read a column at a time in step-by-step fashion.

At the conclusion of the down-counting of bit counter 211 a BC0 signal is developed on conductor 232 which is appiled over conductor 234 to AND gate 235 whose other input receives the SBC signal indicating when a card is in position for the reading of its last column of data. When gate 235 is energized, a signal is applied over conductor 238 for resetting the continue reading flip-flop 203, which remains reset until the next card appears in position to be read which is signalled by the receipt of the next card field signal CFD and reader ready switch signal SRR by AND gate 201.

Referring again to FIGURE 2, there are two occurrences which will interrupt the incremental advancement of a card in the card reader and the successive reading of the columns of the card. These are the detection of a skip control character by skip decoder 71 and the detection of the arbitrarily designated asterisk control character by asterisk decoder 81.

Of the three specified skip characters utilized in the preferred embodiment, one serves as a card filler, another as an end of block signal, and the third as an end of card signal. The skip characters, which are represented by different codes, are detached and decoded by skip decoder 71 which activates internal control 57 for causing continuous card advancement in the reader.

Referring again to FIGURE 4, the detection of a skip character by the skip decoder opens AND gate 219 via circuit terminal 218 upon the receipt of a strobe signal on conductor 216. A signal is developed on conductor 220 which resets counting flip-flop 209, sets card movement flip-flop 229 and resets continue reading flip-flop 203. The resetting of CON FF 203 disables AND gate 231 and prevents the resetting of the card movement flip-flop by the card-in-movement signal SEM. The CM FF remains in the ONE state and causes continuous advancement of the card in the reader.

The specified asterisk character is encoded on partially-filled cards after the last entry of data. It is decoded by asterisk decoder 81 shown in FIGURE 2, for energizing asterisk subroutine control 83, which activates internal control 57 and figures-letters character generator 95. Detection of an asterisk character causes the card reader controller to inhibit transmission of the asterisk character, to generate and transmit a Letters shift character from generator 95, to generate a carriage return, carriage return, line feed sequence of characters (CR–CR–LF) from generator 85 for transmission to the system through output register 63, and to skip the remainder of the card under the control of a counter, for example.

The skipping of the remainder of the card in the asterisk subroutine follows the generation of the CR–CR–LF sequence by generator 85 which passes through output register 63 and is detected and counted by sequence decoder 87 through cable 86 for energizing card movement control 59 over conductor 88. The manner in which the CR–CR–LF sequence decoder 87 signals card movement control 59 for skipping the remainder of the card may be seen by reference to FIGURE 4. The output of the sequence decoder is applied to circuit terminal 218 for opening AND gate 219 upon the occurrence of a strobe signal in the same manner as occurred upon the detection of a skip character. Continue reading flip-flop 203 is reset by a signal on conductor 220 and card movement flip-flop 229 is set, disabled gate 231 preventing the card movement flip-flop from being reset which results in continuous advancement of the card in the reader.

Data is transmitted to the system input terminal by output driver 43 of FIGURE 2 in a 5-bit serial code which has a maximum of 32 different combinations. If it is desired to transmit more than 32 different letters and figures or symbol characters to the data processing system, then a shift code must be transmitted to the system each time the data to be transmitted changes from one of the alphabetic letter characters to a numerical figure or symbol character, and vice versa.

In the preferred embodiment, letters characters were considered lower case functions and figures or symbol characters were considered upper case functions. Each 12-bit data word received by the data transfer controller on bus 52 is applied to shift decoder 91 and figures-letters character decoder 101, as well as to the other decoders and the code converter.

A "figures shift" character is inserted between the transmission of letters and figures and a "letters shift" character is transmitted when data changes from figures or symbols to alphabetic letter characters. Shift decoder 91 detects each change from figures to letters or from letters to figures and activates shift subroutine control 93 for generating the appropriate figures shift character or letters shift character unless the appropriate figures or letters shift character is received from the card reader and detected by figures-letters character decoder 101. Upon the detection of a figures or letters shift character by decoder 101, figures-letters character control 103 causes figures-letters character generator 95 to generate the appropriate figures or letters shift character and to transmit the same to output register 63 under the control of a counter, for example, for transmission to the data communications system. Shift subroutine control 93, in addition to being connected to internal control 57, is also connected to figures-letters character generator 95 for causing the generation and transmission of an appropriate figures or letters shift character to the data system should such a shift character be erroneously absent between data received from the card reader.

Characters of data received from the card reader are converted by code converter 61 from Hollerith binary code to 6-bit Baudot or Intermediate Machine Code (IMC) characters. These are conducted by 6-wire information bus 62 to output register 63, a stage of which stores the most significant bit of the character. Conductor 104 is connected to the output of the most significant stage of output register 63 and to figures-letters character control 103 which detects when that stage is changed or complemented without an accompanying figures shift character or letters shift character.

The generation and supervision of figures shift characters and letter shift characters by the data transfer controller can be understood better by reference to the illustrative flow chart of FIGURE 5. This chart shows a series of steps for providing automatic generation and transmission of shift control characters by the controller when erroneously absent in the card reader output. Upon the reading of a column of a card, the routine is started as indicated at 301 and a 12-bit Hollerith code character is received by the controller as indicated by block 303. The code converter then converts the received character to a 5-bit Baudot code character as indicated by box 305 and generates the most significant or sixth bit of the character which is stored in a stage of the output register, as represented by box 307 of FIGURE 5.

Next, the figures-letters character decoder 101 detects whether the received character is a numerical figure or symbol as indicated at step 309. If it is, the controller proceeds to step 311. If it is not, the controller proceeds to step 331.

At step 311, figures-letters character control 105 determines whether the previous character was also a figure by detecting whether the sixth stage of output register 63 was complemented. If it was, then switch 320 at the input of the output register is closed and the present character is transferred to the output register for transmission to the data processing system. If the previous character was not a figure as is the present one, then at step 313 the controller will transmit the present character to the system through switch 320 if it is a figures shift character. If not, then the data transfer controller holds the present character in the converter as indicated by box 315 and causes generator 95 to generate the figures shift character for transmission to the system at step 317. The character in the converter is thereafter transferred to the output register for transmission to the system. No card movement signal is sent to the card reader while a character is being held in the converter and a shift character is transmitted to the data system. Advancement of the card in the reader is resumed after the character held in the converter is itself transmitted to the system.

If figures-letters character decoder 101 determined that the character received is not a figure at step 309, and is instead a letter at step 331, then character control 105 determines whether the previous character was similarly a letter at step 333. If it was, then routing switch 320 is closed and the present character is transferred to the output register for transmission to the system. If it is determined at step 333 that the previous character was not a letter as is the present character, then figures-letters character control 105 determines at step 333 whether the present character is the letters shift character. If it is, switch 320 is closed and it is transferred to the output register for transmission to the system. It was not, then the present character is held as indicated at box 337 and generator 95 generates the letters shift character at step 337 and transmits the same to the system through the output register as indicated at box 339.

The character held in the converter is then transferred to the output register for transmission to the system. Again, no card advancement occurs when a letters shift character is transmitted to the system. Card advancement is resumed only after the character held in the code converter is itself transmitted to the system.

Obviously, many modifications and variations of the present invention are possible in the light of the above teachings. It is therefore to be understood that within the scope of the appended claims, the invention may be practiced otherwise than as specifically described.

I claim:

1. Controller apparatus for data transfer devices comprising:

input means adapted to receive information signals from a data transfer device, output means electrically coupled to said input means for controllably transmitting signals corresponding to the input information signals;

decoding means to receive and distinguish control codes received by said input means, and control means adapted to transmit and to receive control signals to and from said data transfer device and comprising means coupled to said decoding means and to said output means for controlling the incremental advancement of information in said transfer device and means subject to preselected overriding control codes for changing the mode of the information advancement.

2. The controller apparatus of claim 1 wherein input information signals are received by the input means in parallel and the output means transmits the corresponding output information signals serially under control of the control means.

3. The combination of claim 2 wherein the control means comprises a bit counter initiated by a designated control signal for controlling the serial transfer of information signals from the output means and information advancement control means responsive to a predetermined state of the counter for generating an information advancement control signal.

4. The controller apparatus of claim 1 wherein the data transfer device comprises a record reader and the control means transmits move-record command signals thereto and receives advancement-initiated control signals therefrom.

5. The controller apparatus of claim 1 wherein the control means comprises code generation means coupled to said decoding means for generating advancement mode control codes responsive to predetermined input control codes.

6. The controller apparatus of claim 5 wherein the control means further comprises code sequence detection means electrically coupled to said input means and to said output means for causing continuous information advancement in the data transfer device responsive to a predetermined sequence of control codes.

7. The controller apparatus of claim 1 wherein the input means comprises code conversion means and the control means comprises character generation means coupled to said decoding means and to said output means for generating information shift characters responsive to the receipt of predetermined input codes.

8. The combination of claim 7 wherein the control means further comprises shift character control means coupled to said decoding means and to said character generation means for causing the insertion of information shift characters into the output when erroneously absent from the input information.

9. Controller apparatus for data transfer devices comprising:

code converter means adapted to receive information signals from a data transfer device;

output means electrically connected to said converter means for controllably transmitting signals corresponding to the input information signals;

character generation means for generating information shift characters and being electrically coupled to said output means;

decoding means to receive the input information signals and to detect control codes therein; and control means coupled to said decoding means and to said character generation means for causing the generation of information shift characters responsive to predetermined input codes and the erroneous absence of such shift characters.

10. The controller apparatus of claim 9 wherein the control means comprises shift character control means coupled to said decoding means and to said character generation means for causing the insertion of information shift characters into the output when erroneously absent from the input information and there is a change in the information mode.

11. The controller apparatus of claim 9 wherein input information signals are received by the converter means in parallel and the output means transmits the corresponding output information signals serially under control of the control means.

12. The controller apparatus of claim 11 wherein the control means is adapted to transmit and to receive different control signals to and from said data transfer device, respectively, for controlling the incremental advancement of information in the transfer device as the output information signals are transmitted.

13. The combination of claim 12 wherein the operation of the control means is subject to predetermined overriding control codes detected by the decoding means for causing continuous information advancement in the data transfer device.

14. The combination of claim 13 wherein the control means comprises a bit counter initiated by a predetermined control signal for controlling the serial transfer of information signals from the output means and information advancement control means responsive to a preselected count of the counter for generating an information advancement control signal.

References Cited

UNITED STATES PATENTS

| | | | |
|---|---|---|---|
| 3,340,515 | 9/1967 | Little | 340—172.5 |
| 3,334,181 | 8/1967 | Bartlett et al. | 340—172.5 |
| 3,287,704 | 11/1966 | Bains | 340—172.5 |
| 3,229,080 | 1/1966 | Ward | 340—172.5 |
| 3,228,004 | 1/1966 | McGregor | 340—172.5 |
| 3,183,489 | 5/1965 | Laurer et al. | 340—172.5 |
| 3,121,860 | 2/1964 | Shaw | 340—172.5 |
| 2,978,678 | 4/1961 | Winger et al. | 340—172.5 |
| 2,931,014 | 3/1960 | Buchholz et al. | 340—172.5 |
| 2,905,930 | 9/1959 | Golden | 340—172.5 |

GARETH D. SHAW, Primary Examiner

U.S. Cl. X.R.

340—172.5